(12) United States Patent
Bazzo

(10) Patent No.: US 11,660,795 B2
(45) Date of Patent: May 30, 2023

(54) PROCESS AND APPARATUS FOR INJECTION MOLDING OF PLASTIC MATERIALS

(71) Applicant: INGLASS S.p.A., San Polo di Piave (IT)

(72) Inventor: Maurizio Bazzo, San Polo di Piave (IT)

(73) Assignee: INGLASS S.p.A., San Polo di Piave (IT)

( * ) Notice: Subject to any disclaimer, the term of this patent is extended or adjusted under 35 U.S.C. 154(b) by 0 days.

(21) Appl. No.: 17/872,166

(22) Filed: Jul. 25, 2022

(65) Prior Publication Data

US 2022/0355521 A1    Nov. 10, 2022

Related U.S. Application Data

(62) Division of application No. 16/270,679, filed on Feb. 8, 2019, now Pat. No. 11,426,911.

(30) Foreign Application Priority Data

Feb. 13, 2018 (IT) ................ 102018000002639

(51) Int. Cl.
  *B29C 45/76* (2006.01)
  *B29C 45/28* (2006.01)
  (Continued)

(52) U.S. Cl.
  CPC ............ *B29C 45/768* (2013.01); *B29C 45/03* (2013.01); *B29C 45/2806* (2013.01);
  (Continued)

(58) Field of Classification Search
  None
  See application file for complete search history.

(56) References Cited

U.S. PATENT DOCUMENTS 3,976,415 A     8/1976  Hauser et al.
4,131,596 A  *  12/1978  Allen ................ B29C 45/80
                                                          425/149
(Continued)

FOREIGN PATENT DOCUMENTS

CN     103358501 B    6/2016
CN     105984084 B    4/2019
(Continued)

OTHER PUBLICATIONS

Huang, Ming-Shyan, and Cheng-You Lin. "A novel clamping force searching method based on sensing tie-bar elongation for injection molding." International Journal of Heat and Mass Transfer 109 (Feb. 11, 2017): 223-230. (Year: 2017).*

(Continued)

*Primary Examiner* — Benjamin A Schiffman
(74) *Attorney, Agent, or Firm* — RMCK Law Group PLC

(57) ABSTRACT

A method and apparatus for injection molding of plastic material into a cavity of a mold by means of at least one injector whose opening and closing occurs through an electronic control unit and wherein an undesired opening of the mold caused by any overpressure of the plastic material injected into the cavity of the mold is detected by means of transducers and corrected by means of the electronic control unit. The transducers are arranged outside the cavity of the mold.

6 Claims, 6 Drawing Sheets

(51) Int. Cl.
  *B29C 45/80* (2006.01)
  *B29C 45/03* (2006.01)
(52) U.S. Cl.
  CPC .......... *B29C 45/7653* (2013.01); *B29C 45/80* (2013.01); *B29C 2945/76083* (2013.01); *B29C 2945/76163* (2013.01); *B29C 2945/76254* (2013.01); *B29C 2945/76267* (2013.01); *B29C 2945/76478* (2013.01); *B29C 2945/76488* (2013.01); *B29C 2945/76568* (2013.01); *B29C 2945/76598* (2013.01); *B29C 2945/76602* (2013.01); *B29C 2945/76658* (2013.01); *B29C 2945/76755* (2013.01); *B29C 2945/76859* (2013.01); *B29C 2945/76862* (2013.01)

(56) References Cited

U.S. PATENT DOCUMENTS

| | | | |
|---|---|---|---|
| 5,556,582 A | | 9/1996 | Kazmer |
| 6,529,796 B1 | * | 3/2003 | Kroeger ................. G05B 11/42 |
| | | | 700/202 |
| 9,440,386 B2 | * | 9/2016 | Bazzo ................... B29C 45/231 |
| 10,226,889 B2 | * | 3/2019 | Pollard ................... B29C 45/77 |
| 10,399,264 B2 | * | 9/2019 | Huang ..................... G01B 5/30 |
| 10,525,626 B2 | * | 1/2020 | Lawless, III ........ B29C 45/7653 |
| 10,974,430 B2 | * | 4/2021 | Lawless, III ......... G05B 19/042 |
| 11,458,659 B2 | * | 10/2022 | Bazzo ............... B29C 45/14836 |
| 2006/0110489 A1 | * | 5/2006 | Seaver ................... B29C 45/80 |
| | | | 425/150 |
| 2008/0279971 A1 | * | 11/2008 | Wilkerson ............. G01B 11/14 |
| | | | 425/150 |

FOREIGN PATENT DOCUMENTS

| | | |
|---|---|---|
| DE | 2302175 A1 | 5/1974 |
| EP | 1990603 A1 | 11/2008 |
| FR | 2527976 A1 | 12/1983 |
| JP | H0780906 A | 3/1995 |
| JP | 1998113963 A | 10/1996 |
| JP | 2001205656 A | 7/2001 |
| JP | 2001277315 A | 10/2001 |
| JP | 2002103401 A | 4/2002 |
| WO | 2015066004 A1 | 5/2015 |
| WO | 2018094186 A1 | 5/2018 |

OTHER PUBLICATIONS

Italian Search Report dated Oct. 8, 2018. 7 pages.
Japanese Office Action (with English translation and summary) and references cited therein, dated Feb. 16, 2021 in connection with Japanese Application No. 2019-001047.
Chinese Office Action dated Mar. 23, 2021 in connection with Chinese Application No. 201910112388.7. 16 pages.
German Office Action dated Apr. 30, 2021. 4 pages.

\* cited by examiner

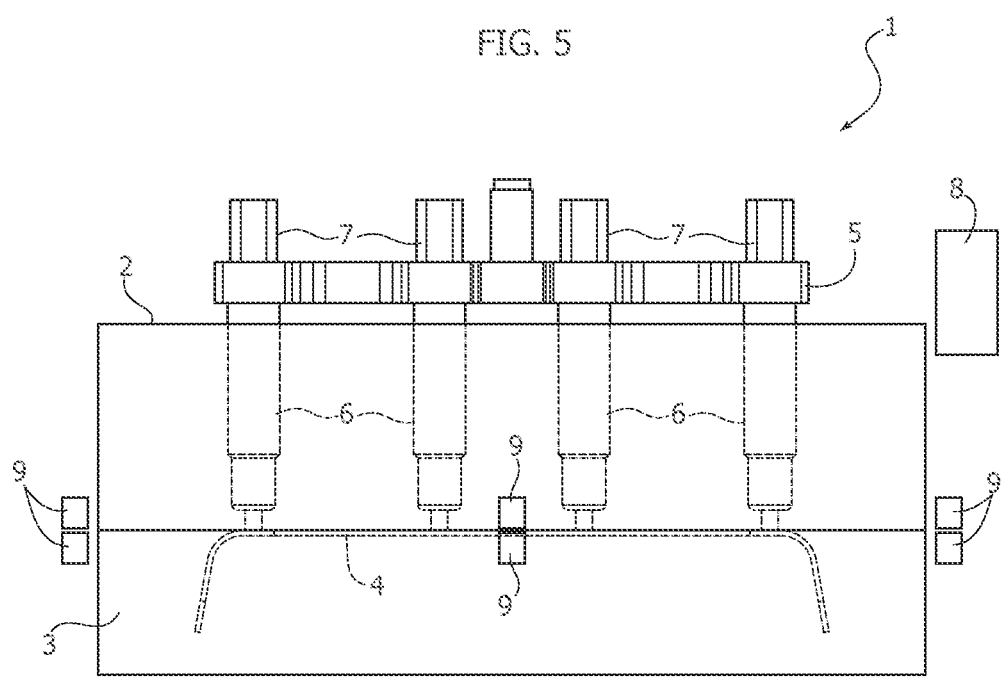

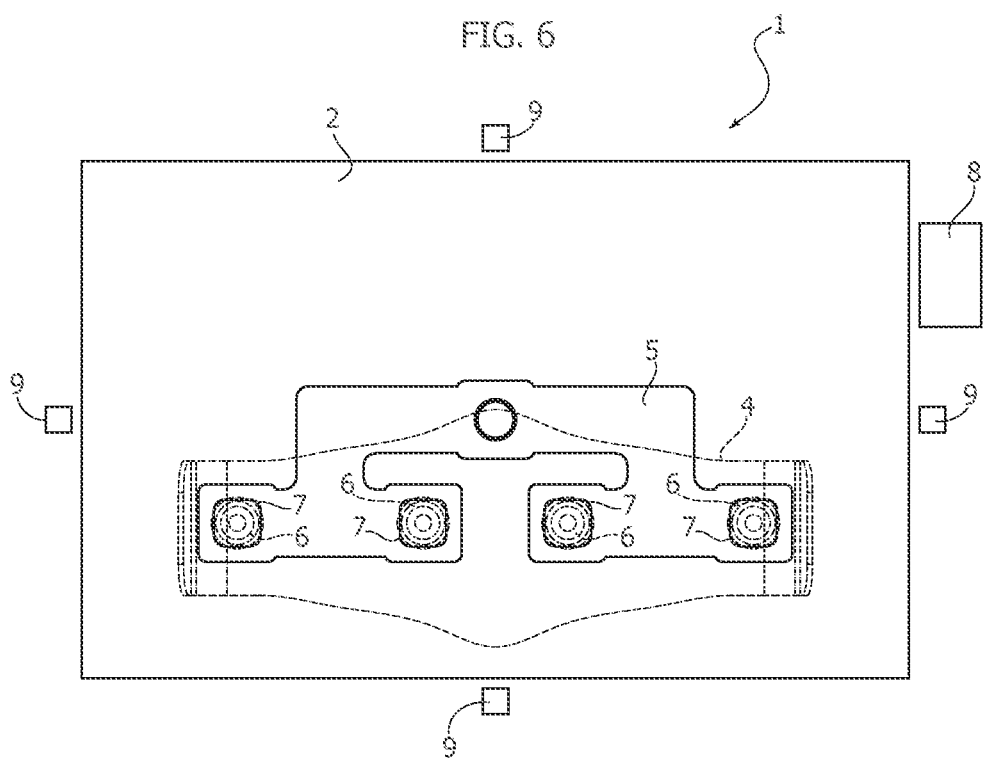

PROCESS AND APPARATUS FOR INJECTION MOLDING OF PLASTIC MATERIALS

CROSS REFERENCE TO RELATED APPLICATIONS

This application is a divisional of U.S. application Ser. No. 16/270,679 filed on Feb. 8, 2019, and claims priority to Italian Patent Application No. 102018000002639 filed on Feb. 13, 2018, the entire disclosure of these applications is incorporated herein by reference.

FIELD OF THE INVENTION

The present invention regards the injection molding of plastic materials into the cavity of a mold by means of at least one injector whose opening and closing are operated by means of an electronic servo-control.

STATE OF THE ART

Over the years, the Applicant has designed and developed an electronic injector control system, referred to as Flexflow®, which guarantees a precise control of the flow of the injected material during the molding process. In particular the actuator of the or of each injector, typically though not necessarily consisting of a rotary electric motor, is electronically controlled so as to adjust one or more among the position, speed and acceleration of the pin valve in a programmable manner, so as to adjust the pressure and the flow rate of the injected plastic, for example as described and illustrated in document U.S. Pat. No. 9,102,085 on behalf of the Applicant.

During the molding process there may arise the problem related to the unwanted opening of the mold caused by an overpressure of the plastic material injected into the cavity. Such opening, even though slight, may cause damage if not the breaking of the mold, as well as the formation of clearly visible defects on the molded articles.

In order to overcome this problem, it was proposed to detect any overpressure of the plastic material injected into the cavity and correct them, or reduce or eliminate them, through the electronic control of the or each injector. Thus, document U.S. Pat. No. 5,556,582 proposes to detect any overpressure of the injected plastic material by using sensors provided in the cavity of the mold. When molding, the degree of opening of the or of each injector is adjusted based on the detection carried out by the pressure sensor in the cavity.

This solution, though efficient when it comes to detecting and correcting possible overpressures, entails the drawback lying in the fact that the presence—inside the cavity of the pressure sensor or several pressure sensors in case of large articles to be molded—entails more or less evident defects on the molded pieces.

Document EP 1990603 describes a laser device applied outside a mold for detecting any separation between the moveable part and the fixed part of the mold.

Though solving the technical problem regarding the detection of the possible opening of the mold, this solution is relatively complex and expensive given that it requires a precise alignment between the laser emitter, reflector and receiver applied to the two parts of the mold. Furthermore, the possible opening detected by the laser device is simply displayed on a display or at most signalled through an acoustic alarm, and thus corrected through the displacement of the re-closure by the moveable part of the mold, thus entailing further technological complexities.

SUMMARY OF THE INVENTION

The object of the present invention is to overcome the technical problem defined above and such object is attained thanks to the fact that in the injection molding method according to the invention the detection of the opening of the mold caused by an overpressure of the plastic material injected into the mold cavity is carried out by means of transducers provided outside the cavity of the mold and the detected opening of the mold is corrected by adjusting the stroke and/or the speed and/or the opening/closing acceleration of said at least one injector during the injection step and/or during the subsequent step of packing the injected plastic material.

The transducer means can be provided outside or inside the mold, but outside its cavity in any case. For example, the transducer means can be positioned on the fixed part of the mold, or on the molding machine plate, or on the slide columns of the moveable part of the mold.

The transducer means can be selected from among deformation sensors, flexion sensors, torsion sensors or pressure sensors. Such sensors can be of the contact type or of the magnetic induction type.

Should the injection be actuated by a plurality of autonomously controlled injectors, the method according to the invention further provides for an auto-tuning method wherein, upon defining the tolerable maximum opening value of the mold, the opening of an injector is commanded sequentially at a time and the impact of each injector is verified through the aforementioned transducer means depending on such maximum value. The impact of each injector in the course of the subsequent molding cycle is taken into account during the electronic control.

The invention also regards an injection molding apparatus for the implementation of the method.

BRIEF DESCRIPTION OF THE DRAWINGS

The invention will now be described in detail with reference to the attached drawings, provided purely by way of non-limiting example, wherein.

DETAILED DESCRIPTION OF THE INVENTION

Figure 1:
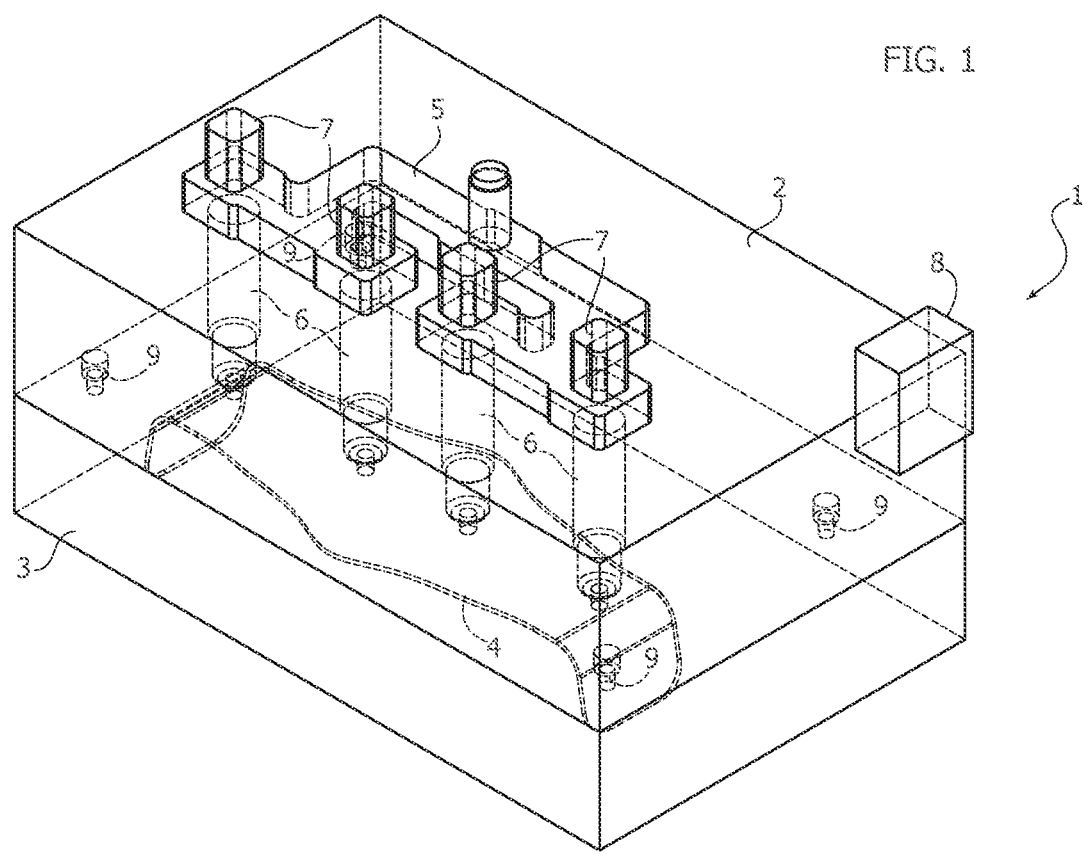
FIG. 1 is a schematic perspective view showing—in a transparent manner—a first example of an injection molding apparatus for implementing the method according to the invention.
Figure 2:
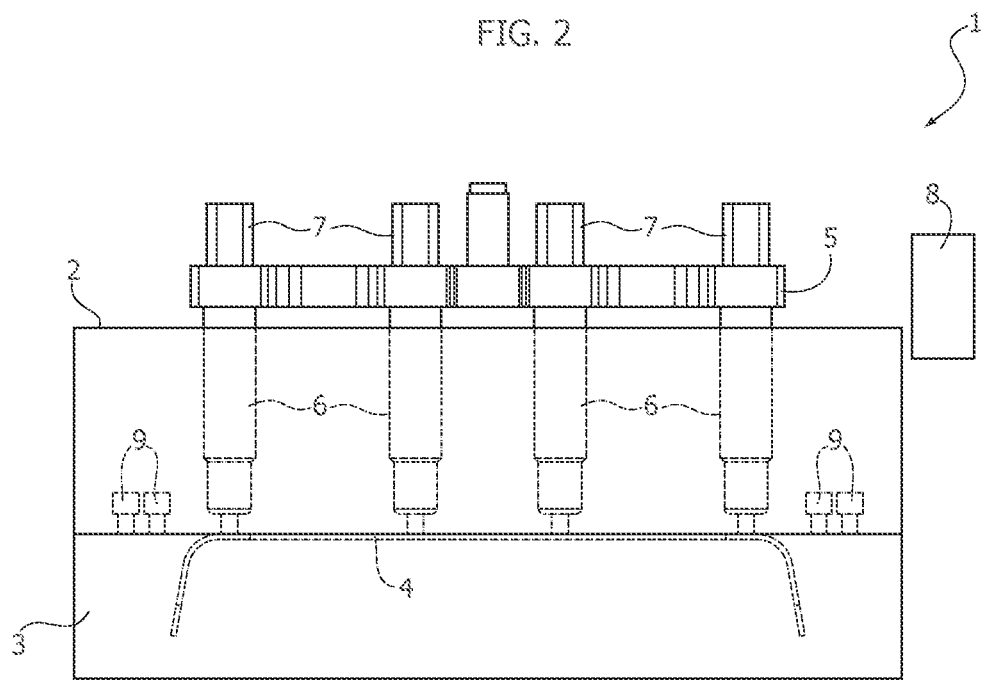
FIG. 2 is a lateral elevational view of FIG. 1.
Figure 3:
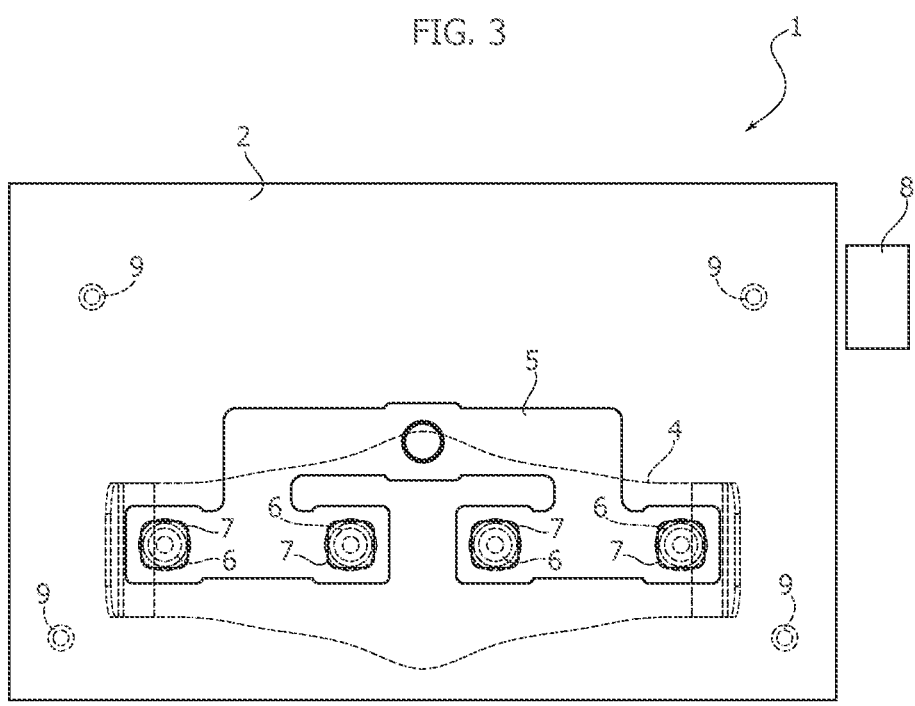
FIG. 3 is a top plan view of FIG. 2, and FIGS. 4, 5 and 6 are views respectively analogous to FIGS. 1, 2 and 3, showing a second example of the apparatus for implementing the injection molding method according to the invention.

Initially with reference to FIGS. 1, 2 and 3, a first example of an apparatus for the injection molding of plastic materials for the implementation of the method according to the invention consists in a mold 1 formed by a fixed part or matrix 2, applied in a known and not illustrated manner to a molding machine plate, and a moveable part or die 3 displaceable with respect to the fixed part 2 along the slide columns, also known and not illustrated in detail. In the closing position of the mold 1 represented in the drawings the fixed and moveable parts 2, 3 mutually define a molding cavity 4. In the case of the illustrated example, the cavity 4 is configured for molding a large spoiler for use in the automotive industry.

The mold 1 is equipped with an injection system which conventionally includes a distributor or hot runner 5 supplied by a molding press and connected to a series of injectors 6 also of the conventional type. It should be observed that the number and arrangement of the injectors 6 are provided purely by way of example.

Each injector 6 comprises—in a per se known manner and thus not illustrated in detail, —a nozzle in which there is axially mobile a pin valve displaceable between a position of full closure and a position of maximum opening for the injection of the pressurised plastic material into the cavity 4. The displacement of the pin valve of each injector 6 is controlled by a respective actuator 7, of the fluid or more conveniently of the electrical type, for example of the rotary type, controlled by means of an electronic unit schematised with 8.

The electronic control unit 8 is programmed so as to control each actuator 7, and thus each pin valve 6, so as to adjust the pressure and the flow rate of the plastic material injected by it into the cavity 4 during the molding cycle. The control may in particular provide for the adjustment of the position, speed, acceleration and stroke of the pin valve of the injector 6 during the step of filling the cavity 4.

The molding apparatus according to the invention is also provided with transducer means provided for detecting an undesired opening of the mold 1 caused by an excessive pressure of the plastic material injected into the cavity 4 and operatively connected to the electronic unit 8 which is programmed, as clarified hereinafter, so as to limit or even eliminate the opening of the mold 1.

According to the distinctive characteristic of the invention, these transducer means are positioned outside the cavity 4 and they are arranged inside the mold 1 or even outside the same.

In the embodiment represented in FIGS. 1, 2 and 3 the transducer means consist of a series of four sensors 9 positioned in the fixed part 2 of the mold 1 so that they face the moveable part 3 in the closing position of the latter. The sensors 9 can be selected from among deformation sensors, flexion sensors, torsion sensors, pressure sensors, and they can be of the contact type or of the magnetic induction type.

When operating, should the mold 1 be closed and the plastic material coming from the hot runner 5 be introduced into the cavity 4 by means of the injectors 6, the sensors 9 detect a possible opening movement of the moveable part 3 relatively to the fixed part 2 due to excessive pressure of the plastic material injected into the cavity 4 and send corresponding signals to the electronic unit 8. The electronic unit 8 identifies the injector/s 6 that caused the possible detected overpressure and corrects it by adjusting the opening stroke and/or the speed and/or acceleration of the relative pin valve, thus restoring optimal pressure. Basically, a maximum opening value of the mold 1 is predefined upon reaching which the opening of the injector/s 6 that triggered such maximum value is interrupted or reduced.

It should be observed that the aforementioned correction step can be actuated not only in the step of introducing the plastic material into the mold but also during the subsequent step of packing of the injected plastic material.

Figure 4:
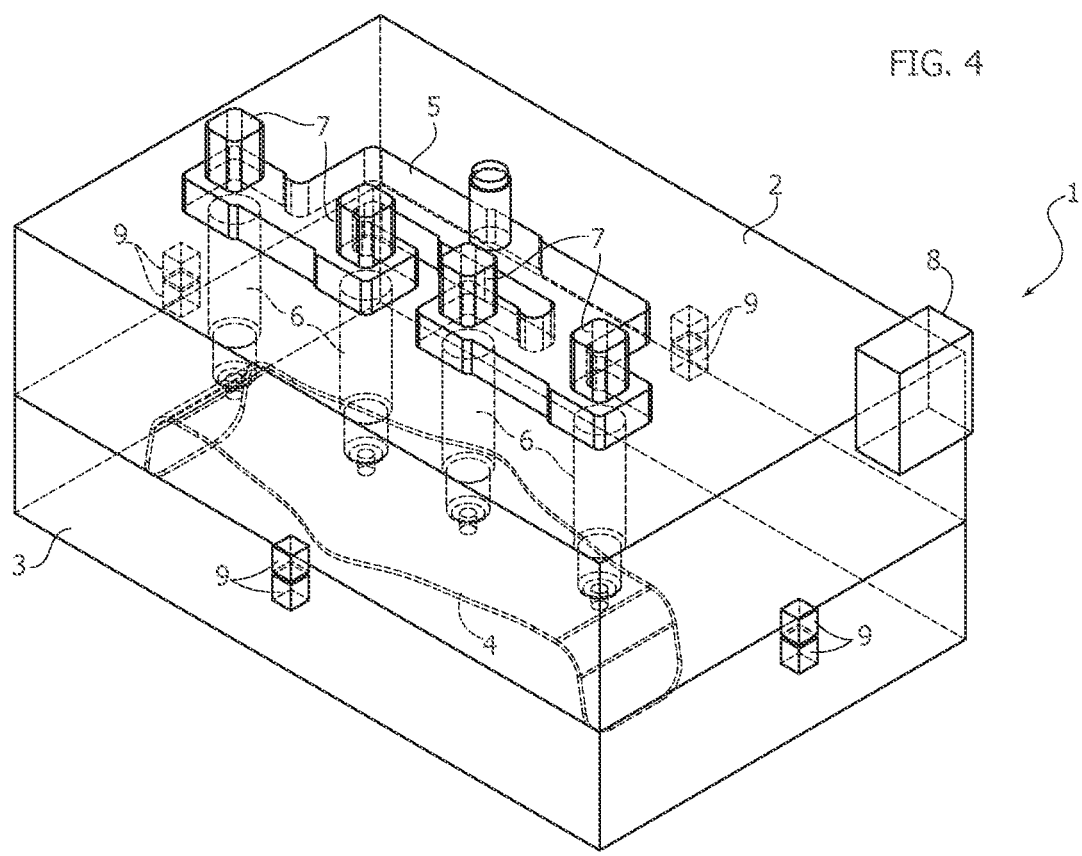

In the case of the variant represented in FIGS. 4, 5 and 6, in which parts identical or similar to the ones already described previously are indicated using the same reference numbers, the sensors 9 are applied outside the fixed part 2 and the moveable part 3 of the mold 1, in mutually faced conditions.

It should be observed that the transducers for detecting the undesired opening of the mold 1 could also be arranged in positions different from the ones represented in the illustrated examples, and even outside the mold 1 such as for example on the molding machine plate or along the slide columns of the moveable part 3 relatively to the fixed part 2. In any case, these sensors will always be arranged outside the cavity 4 of the mold 1, hence their presence will not affect the aesthetic and structural characteristics of the articles molded in the cavity 4 in any manner whatsoever.

As previously mentioned, the invention provides for, at the beginning of the molding cycle, an initial auto-tuning step in which, upon defining a tolerated maximum opening value of the mold 1, the opening of an injector 6 is sequentially commanded at a time and there occurs, by means of the sensors 9, the impact of each injector depending on the tolerated maximum opening value. This allows detecting which areas of the mold 1 are most stressed by each single injector 6, irrespective of the opening sequence of the injectors 6 during the molding cycle. This allows monitoring the impact of each injector 6 and the electronic unit 8 is capable of calibrating the injectors that affect a particular area of the mold 1.

Obviously, the construction details and the embodiments may widely vary with respect to what has been described and illustrated, without departing from the scope of protection of the present invention as defined in the claims that follow.

The invention claimed is:

1. An apparatus for the injection molding of plastic material into a cavity of a mold formed between a fixed part and a moveable part, including at least one injector having a pin valve whose opening and closing are carried out by an electronic control unit, the apparatus comprising:
   a transducer arrangement configured to detect an undesired opening of the mold caused by pressure of the plastic material injected into the cavity, said transducer arrangement being operatively connected to said electronic control unit, and said transducer arrangement being positioned outside the cavity of the mold,
   said electronic control unit being configured so as to reduce pressure inside the mold to limit said undesired opening of the mold by adjusting a speed and/or an opening/closing acceleration of said pin valve of said at least one injector during injection of the plastic material into the cavity and/or during subsequent packing of injected plastic material, and
   wherein a maximum opening value of the mold is established, and upon reaching which an opening of said pin valve of said at least one injector during its opening stroke is interrupted by said electronic control unit.

2. The apparatus according to claim 1, wherein said transducer arrangement is positioned on said fixed part of the mold.

3. The apparatus according to claim 1, wherein said fixed part is applied on a molding machine plate, and wherein said transducer arrangement is positioned on said molding machine plate.

4. The apparatus according to claim 1, wherein said moveable part is displaceable relative to said fixed part along slide columns, and wherein said transducer arrangement is positioned on said slide columns.

5. The apparatus according to claim 1, wherein said transducer arrangement is selected among deformation sensors, flexion sensors, torsion sensors, pressure sensors and such sensors are of a contact type or of a magnetic induction type.

6. The apparatus according to claim 1, wherein the at least one injector includes a plurality of autonomously controlled injectors, and wherein the electronic control unit is configured to command an initial auto-tuning step at a beginning of a molding cycle in which, upon defining the maximum opening value of the mold:

- an opening of each injector is sequentially commanded at a time and there occurs, through said transducer arrangement, a measured impact of each injector's pin valve on the undesired opening of the mold relative to said maximum opening value,
- based on the measured impact, determining one or more areas of the mold where each single injector has a largest measured impact on the undesired opening of the mold relative to said maximum opening value,
- wherein such measured impact is monitored during electronic control of the pin valve of each injector during a subsequent molding cycle, and
- based on said monitoring and measured impact, calibrating one or more injectors of the plurality of injectors to reduce the measured impact on the undesired opening of the mold relative to the maximum opening value in a particular area of the mold.

\* \* \* \* \*